Patented Oct. 1, 1946

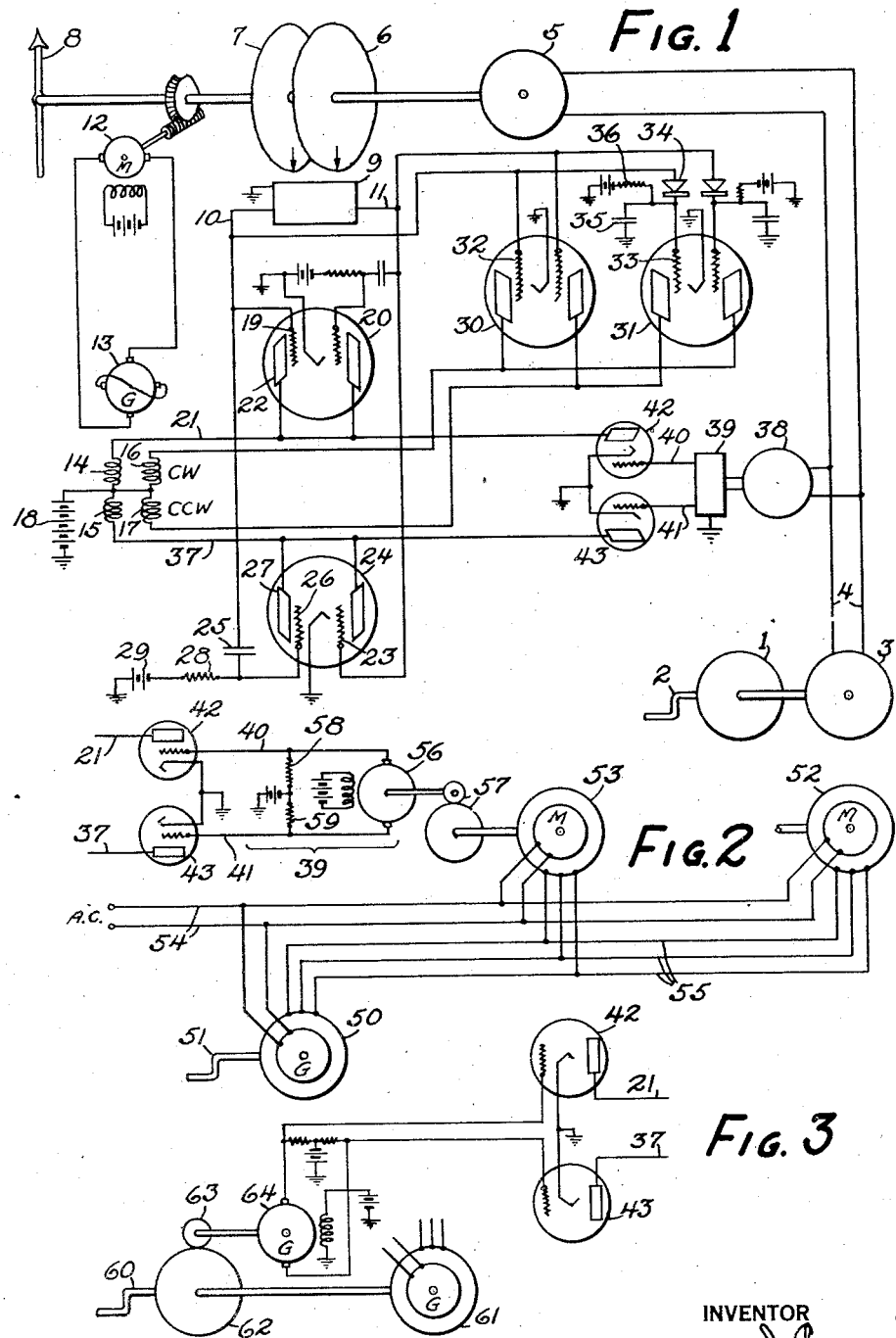

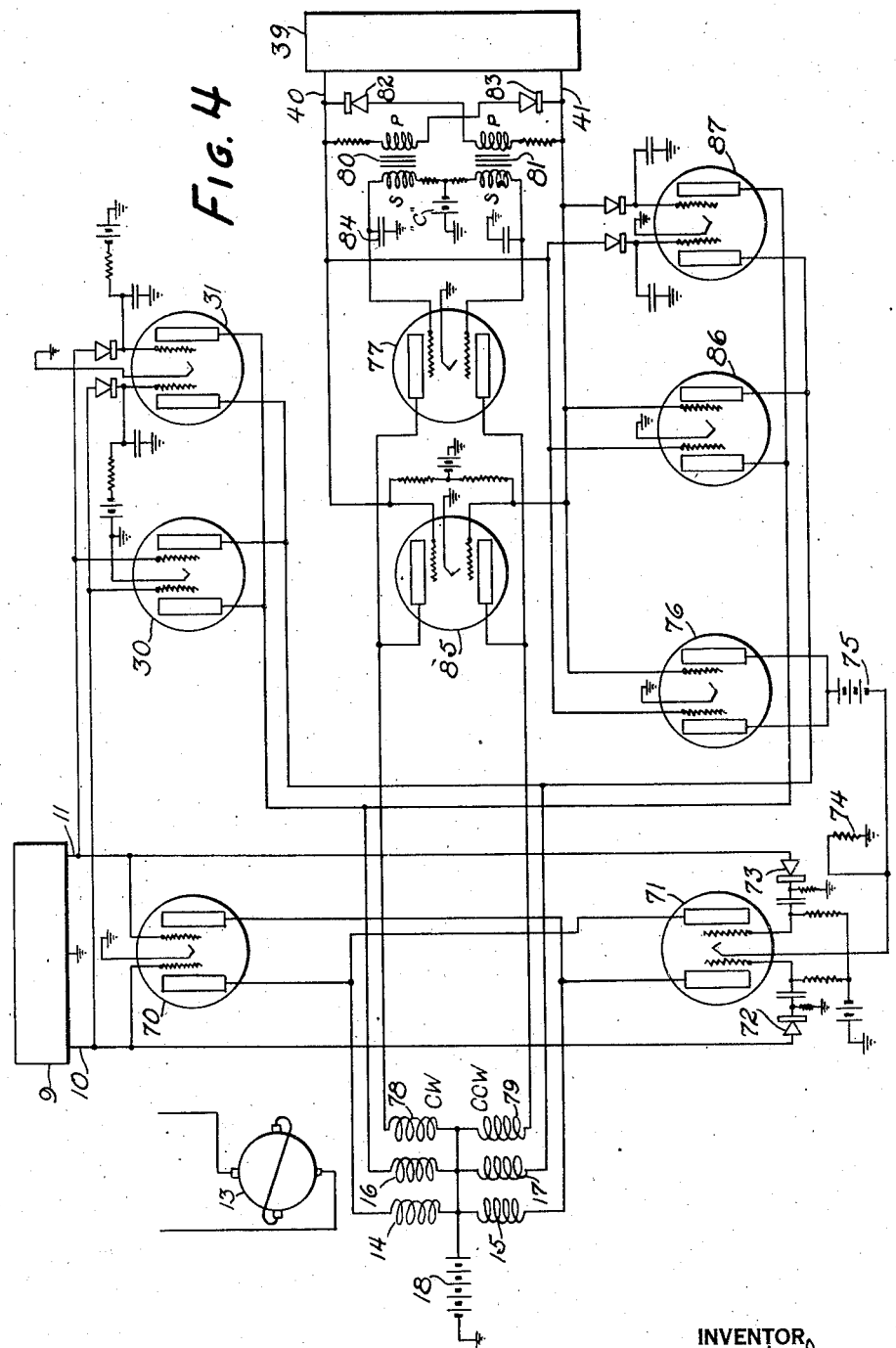

2,408,485

UNITED STATES PATENT OFFICE 2,408,485

POSITION CONTROL SYSTEM

Judson O'D. Shepherd, Atlanta, Ga.

Application April 6, 1942, Serial No. 437,837

16 Claims. (Cl. 172—239)

This invention relates generally to data transmission systems and particularly to servo-motor arrangements whereby a ponderous device such as an anti-aircraft gun can be accurately controlled and made to follow the movement of a controller by signal conditions of relatively small energy transmitted over interconnecting circuits.

One feature of this invention is to provide a variable inertia characteristic to the system by electrical circuit arrangements to reduce hunting while maintaining maximum sensitivity.

A second feature is to improve the characteristics of such arrangements when they are used for following operations, as in anti-aircraft practice to control a gun continuously bearing on a moving object. Heretofore, the driving arrangements for the gun or the like have depended for energization upon detection of a deviation of the gun position from that of an associated element driven in response to signals, or recognition of a deviation in some character of electrical signals or conditions. As a consequence of this method of control there is a tendency during a following operation for the gun to follow with an angle of lag and error at high desired angular speeds, and at low ones to proceed in a series of accelerations and decelerations with frequent overruns. The present invention improves the following operation by providing a primary control of the gun driving arrangements which is responsive directly and in proportion to the information conveyed by the signals, and modifying this primary control by a second one which is effective upon detection of a deviation of the gun from the instantaneous position which it should occupy, to correct for such deviation. That is, the gun is driven at approximately the proper speed of follow in response to the signals and a difference detector is employed to correct for the small errors which may arise. This, in effect, causes the control elements to start functioning in anticipation of a deviation to correct for it before it arises and thereby substantially preventing its existence.

Another feature is the provision of dynamic braking of the gun or the like when it is decelerated. Several such braking effects are disclosed which can be used individually or in combination. One is effective to prevent overrun when the gun is being driven and approaches the position called for by the signals. A second is responsive to a signal decrement as, for example, during a following operation when it becomes necessary to slow down the speed of follow. A third which may be provided also is responsive to signal decrements as a supplement to or substitute for the second one mentioned.

Still another feature provides for energizing the driving arrangements as a function of the signal increment to overcome the inertia of the device and its associated mechanical elements when it is necessary to start the device if it is stopped or to accelerate it if it is in motion.

The above controls fall into two general classes. One is responsive directly to the signals. It controls the speed of the device as a direct function of the signals and also from a derivative of the signals algebraically considered to provide extra energy to the driving means to overcome the inertia of the device and its associated mechanical elements for acceleration, or braking required for deceleration. The second class is under control of a difference detector which effects operations in response to the existence of a difference between the position of the device and that called for by the signals to reduce the difference to zero. A time delay is introduced into the latter controls to prevent hunting under static conditions, with arrangements to disable this delay upon receipt of signals calling for change of position of the device. The second class may also contain braking to prevent overrun of the position of correspondence.

The above and other features will be understood from the specification which follow and the drawings which consist of two sheets with four figures.

Figure 1 is a schematic of the fundamental arrangements.

Figure 2 shows a means for securing a derivative of the signals.

Figure 3 indicates an arrangement for providing the controls with the equivalent of a derivative of the signals but which is independent of the signals per se.

Figure 4 shows a schematic of the provision of both classes of controls with certain alternatives of arrangements shown by Figure 1.

In the schematic presentation of this invention as shown by Figure 1, dial 1 represents an element the angular position of which is to be followed by a device at a remote point. It is conventionally shown as being driven by crank 2 but may, of course, be operated by any suitable mechanism or appropriate source of data as, for example, a fire control device or computer. Element 3, which is under control of dial 1, is a signal transmitter which places on conductors 4, of which there may be more or less than the two shown depending on the signal system used, signal conditions to control the remote device. A signal receiver 5 operates in response to received signals to drive disc 6 whereby the latter accurately reproduces the position of dial 1. Many such remotely controlled position reproducing arrangements are known to the art, of which the Selsyn system is perhaps the most familiar. Disc 6 represents the primary element of an appropriate comparator of any suitable type known to the art and is represented here as including a second element indicated as disc 7 suitably connected to the remote device represented by the arrow 8, and the difference detector 9. The Watson Patent 2,252,053 of August 12, 1941 is an example of the many known arrangements for providing circuit conditions responsive to deviation of a following device from a master element, but it is to be understood that in practicing this invention any suitable comparator based on any detectable phenomena with appropriate response characteristics may be used since it will be evident from what follows that this invention is not limited to any particular type of comparator or equivalent means. The device 8 may be an indicating needle, a ship's rudder, an anti-aircraft gun or any other device which is to be accurately controlled from a remote point. The difference detector 9 recognizes any disparity which may exist or arise between the positions of discs 6 and 7 and, as a result of such disparity, places on either conductors 10 or 11 a potential depending, respectively, on whether the device 8 and disc 7 must be driven clockwise or counter-clockwise to restore correspondence with the position of disc 6. It is preferable that the difference detector energize the leads 10 and 11 in an amount which is a function of the disparity in the relative positions of discs 6 and 7, which is to say the angular difference between device 8 and dial 1, at least in the range around correspondence between the two. The point of correspondence between the positions of discs 6 and 7 will be referred to herein as "zero."

Device 8 is driven through suitable gearing by motor 12 which is conventionally indicated as being of the shunt type with constantly excited field and, therefore, responsive as to direction and speed of rotation to the direction and magnitude of the current supplied its armature. The motor armature is connected to the armature of generator 13 which is indicated as being of the Amplidyne type, although other types of generators can be employed. This generator has two pairs of differential windings of which 14 and 15 are one pair and 16 and 17 the other. Other field windings may be provided as is familiar to Amplidyne practice. These shown are connected to the positive terminal of a D. C. power supply conventionally indicated as battery 18. The windings of each pair are identical and if both of a pair are equally energized there will be no resulting magnetization of the generator field. Magnetization of either field 14 or 16, or both together, will cause the generator to supply current in such direction as to cause motor 12 to drive device 8 in a clockwise direction, and the energization of either winding 15 or 17, or both, will result in the counter-clockwise rotation of device 8. The controls effected by these fields are indicated by designations CW and CCW.

Energization of lead 10 in response to angular disparity between discs 6 and 7 requiring the CW rotation of the device to restore correspondence, excites grid 19 of thermionic tube 20 to cause current to flow in a circuit including grounded battery 18, CW winding 14, conductor 21 and plate 22, to result in the device 8 being driven toward zero. When the latter is reached the difference detector 9 removes excitation from lead 10 to stop movement of the device. It is preferable that the difference detector decrease the potential on conductor 10 as zero is approached. Likewise, a relative angular displacement of the discs in the opposite direction will result in the energization of lead 11 to excite grid 23 of tube 24 which will result in the energization of CCW field winding 15 of the generator to drive the device 8 CCW to restore the zero condition.

The above represents an accurate servo-motor arrangement of a generally familiar type, whereby movement of dial 1 will result in a corresponding movement of device 8. Devices of this general class are well known to be subject to hunting, which heretofore has been difficult to overcome while maintaining high sensitivity. This invention substantially eliminates the factor of hunting by a circuit arrangement which provides, analogously, a variable amount of electrical inertia in the system.

Part of the energy placed on lead 10, for example, is transferred across condenser 25 when a disparity is detected. This excites grid 26 of tube 24 to cause a current to flow from battery 18 through CCW winding 15 to plate 27. It will be recalled that potential supplied to conductor 10 resulted in CW field 14 being energized, so momentarily both of fields 14 and 15 will be substantially equally energized and their effect will be practically or wholly offset. Leak 28 will be effective to drain off the charge of condenser 25 through "C" battery 29 over a short interval of time and thereby correspondingly reduce the excitation of grid 26. This will result in the strength of field 15 being reduced at a rate controlled by the capacity of condenser 25 and the resistance of leak 28, so that field winding 14 is allowed to become effective after a moment. A similar arrangement is shown to energize field winding 14 momentarily when lead 11 is energized due to a deviation requiring CCW drive of the device for correction. It is contemplated that the grid condensers and leaks will be chosen as to value to give a time constant which will be different from the natural period of the mechanical system including the device 8, so that tendency to hunt will be suppressed.

Devices of this general class tend to overthrow or overrun their zero position upon restoration of coincidence, particularly where device 8 and its associated mechanical elements are ponderous. Arrangements shown by the prior art attempt to reduce or eliminate this by means of mechanical braking schemes. The present invention secures this by control of generator 13 in such manner that tendency to overrun is overcome by a dynamic braking action of motor 12. Fields 16 and 17, together with tubes 30 and 31 with associated circuit elements, are provided to effect this. The potential placed on conductor 10 for clockwise restoration of correspondence is extended to excite grids 32 and 33, the circuit for the latter passing through rectifier 34, which maye be of any appropriate type. The plate circuits of these tubes are connected respectively to windings 16 and 17 and, by choice of appropriate tube characteristics and adjustment, these two fields are excited equally to have no net effect on generator 13. Let it be assumed that device 8 approaches zero, thereby causing difference detector 9 to reduce the potential on conductor 10. This will reduce the excitation of grids 19 and 32, thereby reducing the current in the two CW fields 14 and 16. Grid 33, however, has connected to it a condenser 35 and leak 36 and its excitation will be maintained for an interval depending on the characteristics of the condenser and leak circuit, the rectifier being effective to prevent a flow of current from the grid circuit back to conductor 10. It, therefore, maintains for an interval the excitation of CCW field 17, the excitation being reduced in accordance with the discharge characteristics of the condenser-resistance grid circuit. This results in the net excitation of the field of generator being reduced much more rapidly than the rate of decrease of potential on control conductor 10. The design of the circuits may be of such that for very rapid decrease in the potential on conductor 10 the direction of generation of 13 may actually be reversed. When the charge on grid 33 leaks down to the potential on lead 10, fields 16 and 17 will be equal and ineffective and the device will be driven at the speed controlled by the excitation, if any, of field 14. It is to be particularly noted that the magnitude of the effect of the so-called braking action is a function of the speed reduction required, the greater the speed reduction as measured by the drop in potential on conductor 10, for example, the greater the braking effect. By appropriate design of the system including the characteristics of tube 31 and the grid network, which may include any appropriate elements within the framework of this invention, the braking action may be made proportional to the square of the difference in the higher and lower rotational speeds which is a measure of the energy to be absorbed from a decelerating rotating system. It will be seen that this same arrangement is also provided for braking effect on deceleration when the device is rotating CCW.

It is contemplated that the driving arrangements for generator 13 may have or be provided with means to absorb power returned from motor 12 during the braking action. A flywheel connected to the shaft of generator 13 may be employed as one means for effecting this.

Devices of this class which are used for following operations, as illustrated by an anti-aircraft gun bearing on a moving plane, have another difficulty. Conventional arrangements, and that so far described herein, require that a difference exist as, for example, between discs 6 and 7, before the control is effective to drive the device 8. With disc 6 constantly moving during a following operation, the controls will be constantly attempting to maintain the zero condition by detecting differences and correcting for them. If the characteristics of the driving arrangements as a whole are such that there is fast response to a detected difference, a slow following operation will result in the device being driven in a series of accelerations and decelerations with possibility of overrun of zero on each acceleration. On the contrary, if the response is slow there will be an angular lag between discs 7 and 6 which will introduce an error into the system.

This operating difficulty is substantially eliminated in the present invention by introducing into the system what may be considered as a "moving zero." By this is meant that disc 7 and device 8, as well as disc 6, are driven in response to signals from generator 3 so that if conditions were ideal there would be no difference to be detected by 9. The detector 9, with its associated elements, is employed to modify the conditions by which device 8 is driven directly in response to the signals to adjust for the inevitable deviation from ideal due to tolerances in the mechanism and circuit characteristics, as well as the variable factor of the angular speed of the object being followed.

Device 38 is provided to be responsive to the signals. It controls a second device 39 to cause it to place on conductors 40 and 41 potential which is proportional to the speed of rotation of disc 6 as called for by the signals, the particular one of these conductors so energized depending, respectively, on whether CW or CCW rotation is called for. These conductors are connected respectively to grid circuits of tubes 42 and 43, the plate circuits of which are connected to conductors 21 and 37 which are in turn connected to field windings 14 and 15. If, for example, signals are transmitted to drive disc 6 CW, tube 42 will be energized to in turn cause current to flow through winding 14 to directly cause the device 8 and disc 7 to be driven CW substantially simultaneously with, and at practically the same speed as, disc 6. Any difference arising between the relative positions of discs 7 and 6 will be promptly detected by detector 9 to result in the excitation of tubes 20 or 24 to cause a greater current to flow through winding 14 if the device is lagging or current to flow through differential field 15 to reduce the net magnetization of the generator 13 if the device leads. The converse of the above operations would result from signals to drive the device CCW.

It will be seen, therefore, that since device 8 and disc 7 tend to be driven in the same direction and at the same speed as disc 6, the operation of detector 9 and its associated elements during a following operation is merely to correct for minor deviations between the speeds and positions of the two discs. The feature of this invention for providing braking action upon deceleration of the device which has been described obviously may be included in the same system with this follow arrangement. As a result, the following action will be smooth and accurate.

Figure 2 shows the described arrangements for improving the following operation as applied to the familiar Selsyn method of control, which is one of the many signalling arrangements which may be employed with this invention. A Selsyn generator 50, corresponding to signal generator 3 of Figure 1, is driven by suitable means shown as crank 51. This generator, as well as the Selsyn motors 52 and 53 of the system are excited from a suitable source of alternating current supplied over conductors 54. The stators of the generator and motors are connected together by three conductors 55 in the conventional manner. Motor 52 corresponds to motor 5 of Figure 1 and drives disc 6. Motor 53 corresponds to device 38 and drives constantly excited generator 56 through gearing 57. The armature circuit of this generator is connected to conductors 40 and 41. The latter conductors are bridged by resistances 58 and 59 with a "C" battery connected to the mid-point to provide a suitable grid control circuit for tubes 42 and 43. This grid network and generator 56 correspond to device 39 of Figure 1. The result of the operation of this arrangement will be to cause field current to flow through conductors 21 or 37, depending upon the direction of rotation of generator 50 and motors 52 and 53, and in magnitude depending upon the speed of their rotation to effect follow control as described above. Where sufficient signal power is available, a single field winding may be substituted for windings 16 and 17 with direct connection to the brushes of generator 56 whereby this field is excited in amount and direction depending upon the speed and direction of rotation of generator 56.

Where a double Selsyn system is employed for increased accuracy of the remote positioning of disc 6 or the equivalent comparing element, it will be preferable for generator 56 to be driven from the high speed portion of the system for more sensitive control at low speeds of follow.

Figure 3 shows another method of providing improved following operation which is completely independent of the type of signalling system employed. A crank 60 or other device drives or controls a signal generator 61, which is illustrated as being of the Selsyn type but may be of any type known to the art, including those employing frequency, phase angle or current conditions for signalling. A gear 62 drives pinion 63 connected to generator 64. The latter excites the grids of tubes 42 and 43 to in turn control the current through conductors 21 and 37 to excite the field of generator 13 in the same manner and with the same alternatives as set out in connection with Figure 2.

Arrangements for further improved operating characteristics of the system are shown by Figure 4. The disclosure of Figure 1 provides that an interval of time elapse upon detection of a difference before the driving arrangements are energized to return the device to zero. Where very quick response to signals is desired this may be objectionable, so the arrangements shown by Figure 4 eliminate this delay feature when signals calling for a change in position are being received but permit the delay to be present to prevent hunting when signals call for a fixed position of device 8. A further feature provided by the latter figure is one which will cause a quick accelerating impulse to be furnished generator 13 upon receipt of signals calling for a change in the position of the device 8, or for acceleration of its motion. This is the reverse of braking action and is for the purpose of overcoming the inertia of the device and driving system upon start or acceleration. A third additional feature provided by Figure 4 is a braking action directly responsive to the signals calling for decelerating or stopping the device 8. Some additional minor changes have also been shown in this figure which may be considered as alternatives of corresponding detailed showings of the preceding figures.

The tube 70 energizes field windings 14 or 15 in response to the difference detector 9. Tube 71, with its grid condensers, provides energization for the differential field energized by tube 70 to introduce a time delay when a difference is detected, substantially as described in connection with Figure 1. Rectifiers 72 and 73, which may be of any appropriate type, may be provided in the grid circuits of tube 71 to preclude any delay of decay of the grid potential of tube 70 when a decrease of speed is called for by 9 by preventing potential on the grid condensers backing up to the grids of the latter tube. The cathode of tube 71 is grounded through resistance 74, and is also connected through battery 75 to both plates of tube 76. The grids of this latter tube are connected to conductors 40 and 41 upon which device 39 places potential proportional to the changes called for by the signals, as described above. As a result of the potential on either of these conductors, tube 76 causes plate current to be drawn through resistance 74, thereby raising the potential of the cathode of tube 71 to or beyond the point of cutoff regardless of the potential supplied the grids of tube 71 by detector 9. The characteristics of tube 76 and the cathode circuit described, including resistance 74, are such that tube 71 is made ineffective upon receipt of even a small signal change. A preceding amplifying tube may be employed ahead of tube 76 to increase the sensitivity of the action just described to very small signal changes. This arrangement provides the desired delay in the system to reduce hunting when the device 8 is to be held in a fixed position but upon receipt of signals calling for a change in position the time delay is removed for quick response.

Tube 77, with associated circuit elements, is provided to improve the acceleration characteristics of the system. The plates of this tube are connected to differential windings 78 and 79 of generator 13. Two transformers 80 and 81 have their secondaries connected to grids of tube 77. The primaries of these transformers are connected across conductors 40 and 41 through rectifiers 82 and 83. Resistances may also be, and are so shown, connected in series with the primary circuits. Assume that a signal change is received which results in positive potential being placed on conductor 40. This will result in an impulse in the secondary circuit of transformer 80 which will energize the upper grid of tube 77 to cause a momentary flow of current in CW winding 78 which is a function of the change called for by the signals. Condenser 84 may be provided to prevent immediate decay of the potential on the upper grid of tube 77 at the end of the accelerating impulse. This same arrangement is shown to be effective to signal changes calling for CCW rotation of the device. As a result of these arrangements, the generator 13 is excited by either field 78 or 79 immediately upon receipt of signals calling for an acceleration. By choice of the characteristics of tube 77 and its grid control circuits, including appropriate other elements than the condenser shown, and the transformers, the magnitude and interval of excitation of the generator may be substantially that required to overcome the inertia of the device to acceleration to the speed called for.

It is the purpose of rectifiers 82 and 83 to prevent a reduction of positive potential on, say, conductor 40 energizing the lower grid of tube 77 as would result if the primaries of the two transformers were connected in series across conductors 40 and 41. Such a connection may, however, be employed, in which case a decrease in the potential on conductor 40 would be effective to momentarily energize CCW winding 79 to provide braking action. With the latter arrangement a single transformer with a middle tap on the secondary to provide a suitable grid circuit may be employed with the primary connected to conductors 40 and 41. It will be understood that if device 39 is of such character as to place positive potential on conductors 40 or 41 in response to signal change rather than positive on one and negative on the other as provided by Figure 2, one end of the primary windings of the transformers may be grounded.

Tube 85 is provided for the purpose of exciting windings 78 and 79 in proportion to the speed called for by the signals during the following operation and is a substitute for tubes 42 and 43 of Figure 1. Its purpose and operation is the same as that previously described with respect to the latter tubes. It is shown connected to windings 78 and 79 which it controls instead of 14 and 15 as with Figure 1.

In some applications of this invention it may be desirable to provide braking of the movement of device 8 directly in response to signals calling for deceleration as well as, or instead of, that shown by Figure 1, which includes tubes 30 and 31. Tubes 86 and 87 are provided for this purpose and correspond in their operation to tubes 30 and 31, respectively. The grid circuits of these tubes are connected to conductors 40 and 41 in the same manner that tubes 30 and 31 are connected to conductors 10 and 11. By virtue of the operation of this arrangement as previously described, a reduction of potential on conductor 40 will result in CCW field 17 being stronger than its companion 16 to result in the desired amount of braking effect. The reverse will be true upon receipt of signals calling for a reduction of CCW speed of device 8.

In the above description reference is made to specific changes as, for example, to the reduction in the excitation due to field windings 16 and 17 under control of tubes 30 and 31 upon difference detector 9 calling for reduction in CW speed of the device. This may refer to a relative change since the windings may be excited from other elements of the system. Such changes described with reference to a specific element may be considered as setting out the influence of that element and not to the exclusion of the influence of other elements. The generator 13 indicated for illustration of this invention produces a potential which is proportional to the net excitation of its field. The direction and magnitude of this excitation will be the algebraic sum of the influences of its several field windings, which, in turn, depends upon the influences of the several elements controlling the current to these windings. Each of the latter elements will be influential as its control function requires to make up a composite magnetization of the generator. There may even be an instantaneous conflict of some of these influences as, for example, when rapid motion of the signal generator is reversed under some conditions. Various of the influences will, however, immediately become additive to provide maximum energy to motor 12 in the proper direction as required for so radical a change.

It may be desirable in some applications of this invention to disable tube 71 only upon receipt of signals calling for acceleration of device 8, leaving tube 71 operable for its described functions when a constant speed of follow is required. This may be effected by connecting the grids of tube 76 in multiple with the grids of tube 77, instead of as shown, to make the former effective to disable tube 71 in responsive to positive derivatives of the signals. This will reduce tendency of the device to hunt during a constant speed following operation.

It is to be particularly recognized that notwithstanding the encorporation of a plurality of individual elements into the system, each of which may vary in performance due, for example, to the ageing of the tubes and variations of temperature and potentials, the system as a whole will remain stable and accurate. This is due particularly to the operation of the difference detector and associated elements which function in response to deviation of the position of the device from that called for by the signals, irrespective of the reason. This provides in the overall what may be considered as a "negative feedback" which is continuously operative to neutralize extraneous influences and errors.

Provision in the familiar manner of various adjustable elements known to the art, such as variable potentiometers, resistances and capacitances, is contemplated to adjust the system and to vary the influences of the several control elements to yield the desired result and responsiveness for each of the uses to which it may be applied. Instruments also may be encorporated in certain of the circuits to provide indications of the performance of the system.

This invention has been described in connection with a device 8 having motion in one plane. It will be understood that where the device is to be operated in two planes as, for example, required with a gun to be trained and pointed, two assemblies such as described may be employed, each to control motion in one of the planes.

The thermionic tubes have been shown for simplicity as being operated from battery supplies. It is contemplated that in practicing this invention a single source of alternating current power may be used to supply the tubes, with the necessary circuit elements provided as is well known to this common practice.

The number of field windings shown for generator 13 and their connection is in no wise limiting in the practice of this invention. A greater or smaller number may be employed with appropriate connections to the other circuit elements set out to provide the operations of the system substantially as described.

The drawing and description of this invention have been limited to the essentials necessary to set it out, and details have been omitted which will be understood by those practiced in the art as being required in the conventional employment of the individual circuit and mechanical elements. It is also contemplated that various modifications can be made in the arrangement as a whole and in its details within the scope of the invention as set out by the appended claims.

What is claimed is:

1. In a position reproducing system, a master positionable device, a secondary positionable device, means to produce signals corresponding to the position of the master device, driving means for the secondary device, control means responsive to deviation of the position of the secondary device from that called for by the signals to energize the driving means to drive the secondary device to eliminate the deviation and means to delay for a time interval the response of the control means to a deviation.

2. In a position reproducing system, a master positionable device, a secondary positionable device, means to produce signals corresponding to the position of the master device, driving means for the secondary device, control means responsive to deviation of the position of the secondary device from that called for by the signals to energize the driving means to drive the secondary device to eliminate the deviation, means to delay for a time interval the response of the control means to a deviation and means to disable the delay means in response to a change in position of the master device.

3. A position reproducing system including a master positionable device, a secondary positionable device, means to produce signals corresponding to the position of the master device, a motor to drive the secondary device, a generator to supply power to the motor, excitation means for the generator, control means responsive to a deviation for a predetermined length of time of the position of the secondary device from that corresponding to the signals to energize the excitation means for the generator to cause the device to be driven to eliminate the deviation.

4. A position reproducing system including a master positionable device, a secondary positionable device, means to produce signals corresponding to the position of the master device, a motor to drive the secondary device, a generator to supply power to the motor, excitation means for the generator, control means responsive to a deviation of the position of the secondary device from that corresponding to the signals to energize the excitation means of the generator to cause the device to be driven to eliminate the deviation, means to delay the excitation of the generator at the beginning of a deviation and means to disable said delay means in response to a change in position of the master device.

5. In a position reproducing system, a master positionable element, a secondary positionable element, means to produce signals coresponding to the position of the master element, driving means for the secondary element, means to control the driving means in response to said signals corresponding to the position of the master element being changed to cause the secondary element to be driven substantially in synchronism with the master element, a device for continuously maintaining a physical position corresponding to that of the master element in response to said signals, and a difference detector effective upon deviation of the position of the secondary element from the pisition corresponding to that of said device to modify the action of the driving means to eliminate the deviation.

6. In a position reproducing system, a master positionable element, a secondary positionable element, means to produce signals corresponding to the position of the master element, a motor to drive the secondary element, a generator to power the motor, first control means responsive to signals corresponding to the position of the master element being changed to energize the generator to cause the secondary element to be driven by the motor substantially in synchronism with the master element, a device for continuously maintaining a position corresponding to that of the master element in response to said signals and secondary control means responsive to deviation of the secondary element from synchronism with the device to modify the energization of the generator to eliminate the deviation.

7. A position reproducing system including a primary element, a secondary device to follow the element, a motor to drive the device, a generator to power the motor in accordance with the excitation of the generator, differential field windings to excite the generator, a vacuum tube plate circuit individual to each field winding, a control grid for each plate, means responsive to a relative deviation between the positions of the primary element and the device to excite one of the grids to cause field energizing plate current to flow to result in the generator being excited to furnish power to the motor to cause the device to be driven to the position corresponding to that of the primary element and means to excite the second grid momentarily when a deviation occurs to effect the energization of the second field winding which is differentially arranged with respect to the first to provide a predetermined time characteristic to the excitation of the generator to reduce hunting of the device.

8. A position reproducing system as defined by claim 7 in which the means to excite the second field winding is disabled when a deviation arises from a change in position of the primary element whereby hunting of the device is reduced without loss of responsiveness to a change called for by the primary element.

9. A position reproducing system including a device to be positioned, a master element the position of which is to be followed by the device, means to produce signals corresponding to the position of the master element, a reversible driving motor for the device, a generator to power the motor in accordance with the excitation of the generator, field means to excite the generator and a plurality of circuit arrangements to control the magnitude and direction of the energization of the field means, the first of said circuit arrangements adapted to provide a component of energization in response to deviation of the device from the position corresponding to the signals and in such direction as to cause the device to be driven by the motor to eliminate the deviation, the second circuit arrangement adapted to provide, in response to said signals indicating changing position of the master element, a component of energization corresponding to the speed and direction of movement of the master element to cause the device to be driven by the motor substantially in synchronism with the master element and the third circuit arrangement adapted to provide, in response to said signals indicating acceleration or deceleration of the master element, a component of energization which is a function of the rate of acceleration or deceleration of the master element to correspondingly accelerate or decelerate the device by the motor, the amount and relative direction of the excitation of the generator at any time depending upon the algebraic sum of the energizing components to cause the motor to be correspondingly powered.

10. A position reproducing system as defined by claim 9 including a fourth circuit arrangement to provide a component of energization in opposition to that provided by the first said circuit arrangement as the device nears the point of synchronism to prevent overrun of latter said point.

11. A position reproducing system including a master positionable element, a controlled object, means to produce signals corresponding to the position of the master positionable element, a device to reproduce continuously the position of the master positionable element in response to said signals, reversible driving means for the object, means responsive to a deviation in the position of the object from that of the device to energize the driving means to eliminate the deviation and means to energize the driving means in a reverse direction to provide, by said reverse energization, a braking action upon the object as it nears the point corresponding to the position of the device.

12. In a position control system, a controlling element, a controlled object, means to produce signals corresponding to the position of the controlling element, a positionable device to reproduce continuously the position corresponding to that of the controlling element in response to the signals, a difference detector responsive to discrepancy between the controlled object and the positionable device, a motor for driving the controlled object, circuit means for controlling the speed and direction of the motor, first control means operative by said difference detector in response to a function of the relative displacement of the position of the controlled object and that of the device for controlling said circuit means to energize the motor to drive the object to synchronize it with the device and a second control means operative by the difference detector for opposing the action of the first control means, said second control means being effective just prior to the actual synchronization of the object with the device to provide an opposition which is a function of the speed with which the object approaches the point of synchronism to prevent the object overrunning the point of synchronism.

13. A position reproducing system including a master positionable element, means to continuously produce signals corresponding to the position of said master element, a secondary positionable object, a drive motor for said object, a generator to energize said motor to provide driving torque in either of two directions, means to excite said generator in an amount and direction which are functions of the algebraic sum of a plurality of controlling influences, means to derive from said signals one of said influences which is a function of the rate and direction of movement of said master element to provide torque to drive said object substantially in synchronism with the master element, means to produce another of said influences which is a function of the direction and magnitude of deviation of the position of the object from that of the master element as indicated by said signals to provide torque to eliminate such deviation and means to produce another of said influences which is a function of the direction and relative rate of approach of said object to the position of said master element as indicated by said signals to provide braking torque toward arresting movement of said object.

14. A position reproducing system in accordance with claim 13, including means to disable momentarily one of said influences.

15. A position reproducing system including a master positionable element, means to continuously produce signals corresponding to the position of said master element, a secondary positionable object, a drive motor for said object, a generator including field means to power said motor to provide driving torque in either of two directions, depending upon the algebraic sum of energizations of the field means of said generator, a first means to energize said field means in an amount which is a function of the first derivative of said signals, a second means to energize said field means in an amount which is a function of the second derivative of said signals and means to energize said field means in an amount and direction which is a function of the deviation of the secondary object from the position called for by said signals to eliminate the deviation.

16. A position reproducing system in accordance with claim 15 including means to disable momentarily one of said means to energize said field means.

JUDSON O'D. SHEPHERD.